Figure 4:
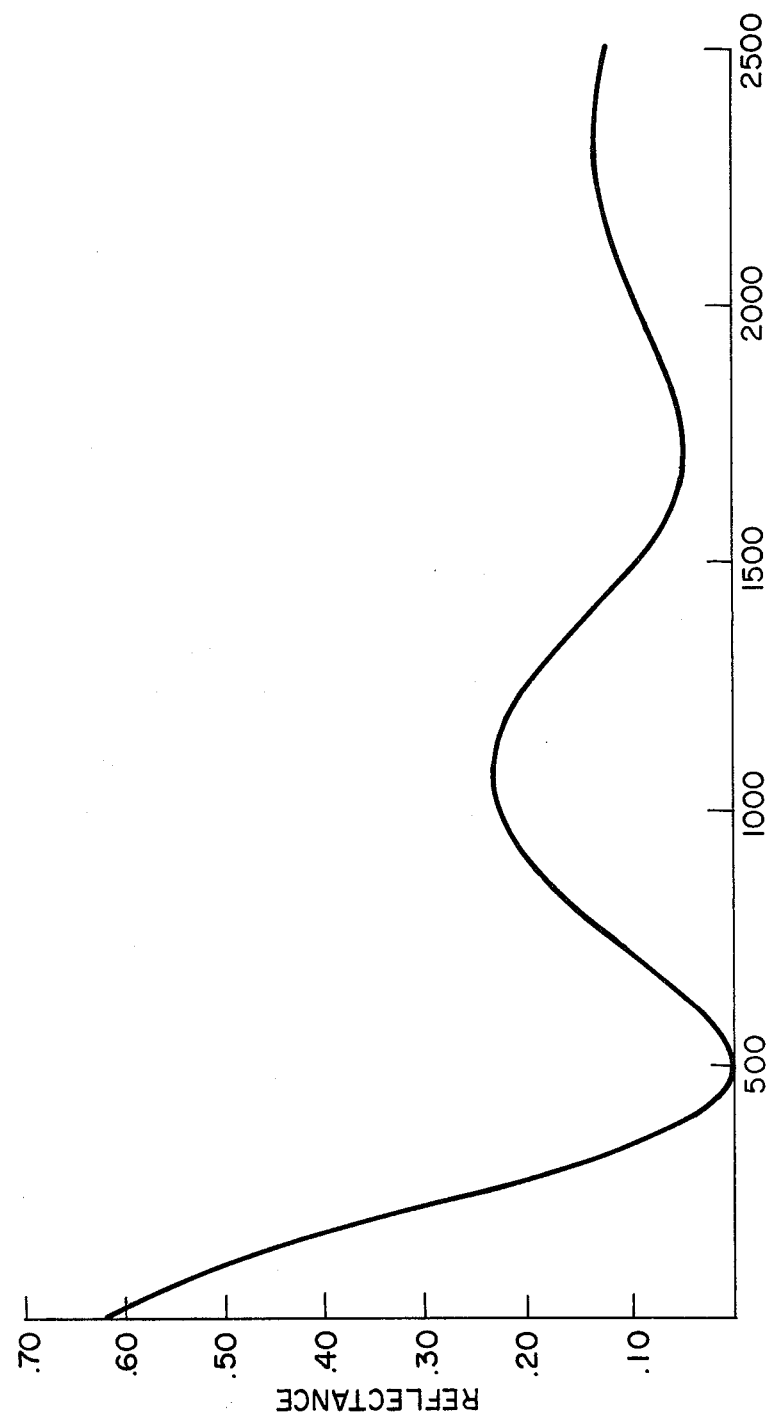

United States Patent [19]

Spong

[11] 4,097,895
[45] Jun. 27, 1978

[54] MULTILAYER OPTICAL RECORD

[75] Inventor: Fred William Spong, Lawrenceville, N.J.

[73] Assignee: RCA Corporation, New York, N.Y.

[21] Appl. No.: 668,495

[22] Filed: Mar. 19, 1976

[51] Int. Cl.² ............ H04N 5/76; G11B 7/24; G01D 15/34
[52] U.S. Cl. ............ 358/128; 179/100.3 V; 274/41 A; 274/42 R; 346/76 L; 346/135
[58] Field of Search ............ 346/76 R, 76 L, 108, 346/135; 274/41 R, 41 A, 41.6 R, 42 R; 340/173 LM, 173 LT; 179/100.3 V; 358/127, 128, 297; 427/164–166; 428/432, 913

[56] References Cited

U.S. PATENT DOCUMENTS

| Re. 28,375 | 5/1975 | Maydan et al. | 358/297 |
|---|---|---|---|
| 3,665,483 | 5/1972 | Becker et al. | 346/135 |
| 3,679,818 | 7/1972 | Courtney-Pratt | 346/76 L |
| 3,832,547 | 8/1974 | Silverman | 346/76 L |
| 3,889,272 | 6/1975 | Lou et al. | 346/135 |
| 3,959,799 | 5/1976 | Gambino et al. | 346/135 |
| 3,980,818 | 9/1976 | Browning | 340/173 LM |
| 4,000,492 | 12/1976 | Willens | 346/135 |
| 4,023,185 | 5/1977 | Bloom et al. | 346/135 |

OTHER PUBLICATIONS

Greenblott, High-density Information Recording by Vaporization of Film Areas, IBM Tech. Disc. Bulletin, vol. 14, No. 8, 1/72 p. 2358.

Primary Examiner—Raymond F. Cardillo, Jr.
Attorney, Agent, or Firm—Eugene M. Whitacre; William H. Meagher

[57] ABSTRACT

A flat major surface of a disc-shaped substrate (e.g., of glass) is coated with a light-reflective layer (e.g., of aluminum). Overlying the reflective layer is a layer of material (e.g., fluorescein) which is highly absorptive for light of a frequency supplied by a recording laser. The coating parameters are chosen to establish an anti-reflection condition for the coated record blank at the recording light frequency. The light output of the laser, which is intensity modulated in accordance with a signal to be recorded, is focused upon the coated surface of the disc as the disc is rotated. With the peak intensity of the focused light sufficient to cause ablation of the absorptive layer, an information track is formed as a succession of spaced pits in which the reflecting layer is effectively exposed. For playback, light of a constant intensity is focused on the information track as the disc is rotated. The focused light is of insufficient intensity to effect ablation of the remaining absorptive material, but is of a frequency at which the undisturbed regions of the coated disc exhibit an anti-reflection condition. A photodetector, positioned to receive light reflected from the information track as the pits pass through the path of the focused light, develops a signal representative of the recorded information.

5 Claims, 4 Drawing Figures

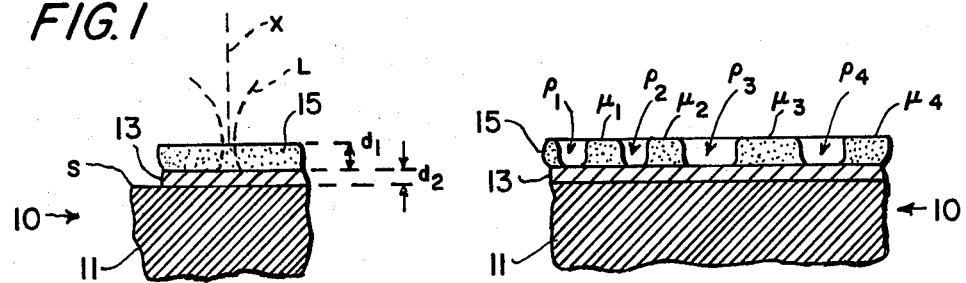
FIG. 1
FIG. 2
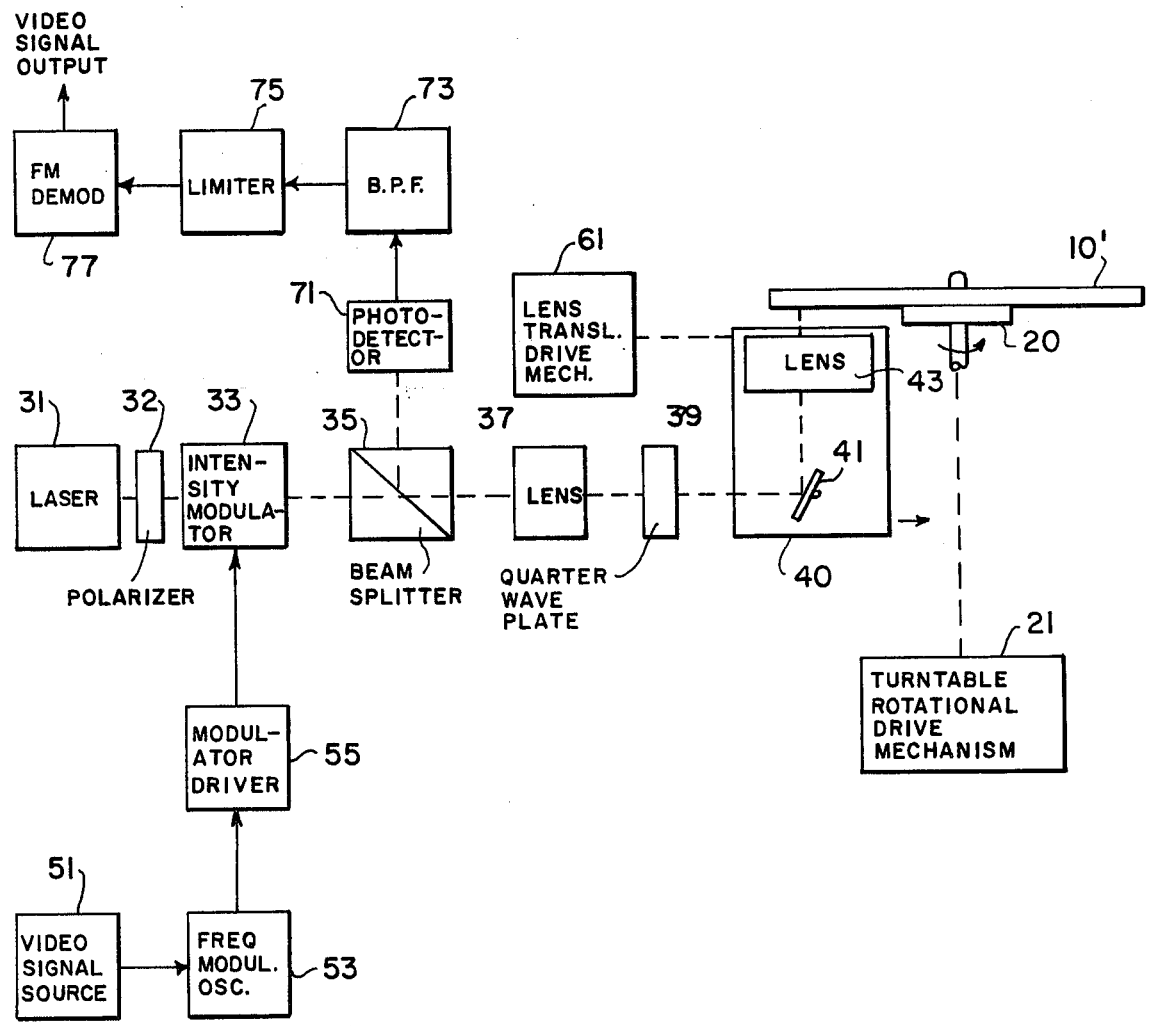
FIG. 3

MULTILAYER OPTICAL RECORD

The present invention relates to a novel information record, to novel optical recording apparatus and methods for use in formation of such an information record, and to novel optical playback apparatus and methods for use in recovery of information from such an information record.

In the prior art, optical recording methods have been proposed in which light from a laser is focused upon the surface of a recording medium with sufficient intensity to cause ablation of surface material. By suitably controlling the intensity of the focused light in accordance with information to be recorded while relative motion is established between the recording medium and the focused light spot, an information representative pattern of pits may be formed in the surface of the recording medium.

In application of such an ablation process, for example, to the high-density recording of video information at "real-time" recording rates, the achievement of an adequate recording sensitivity requires efficient coupling of energy from the recording light beam into the material to be ablated. In accordance with the principles of the present invention, such efficiency of energy coupling may be enhanced by construction of the recording medium in the form of a substrate having a surface which is highly reflective (at least at the frequency of the light forming the recording beam), with a thin layer of material, highly absorptive at the recording beam light frequency, overlying the reflective surface. With both incident light and reflected light (reflected from the substrate surface) passing through the thin absorptive layer, the ability to rapidly elevate the temperature of the absorptive layer material to that required for ablation to take place is enhanced.

Pursuant to a further aspect of the present invention, the efficiency of energy coupling into the absorptive layer may be further enhanced by choosing a thickness for the absorptive layer which establishes an anti-reflection condition for the coated substrate at the recording beam light frequency. With energy loss via reflection minimized due to the anti-reflection condition establishment, and with energy loss via transmission into the substrate minimized by the reflective surface presence, a highly efficient heating of the absorptive layer to an ablation temperature is realizable.

In accordance with an illustrative embodiment of the present invention, a surface of a glass substrate of disc form is processed so as to form polished flat surface, which is then coated with a thin layer of metal (e.g., aluminum) to establish a highly reflective surface for the substrate. This reflective surface is then coated with a layer of material (e.g., an organic dye, such as fluorescein) which is highly absorptive at the light frequency of a monochromatic light source available for recording use (e.g., an argon laser, providing an output as a wavelength of 4579 angstrom units). The thickness of the dye layer is chosen to establish an anti-reflection condition for the coated substrate at the recording wavelength.

The coated disc structure, formed in the above-described manner, constitutes a record blank which may be utilized in conjunction with a suitably controlled light beam source of the appropriate frequency to efficiently effect coupling of energy from the light beam into the absorptive layer.

In an illustrative recording system embodying the principles of the present invention, a record blank of the above-described disc form is subject to rotation at a constant rotational speed while a beam of light from a light source (e.g., a laser, providing light at a frequency at which the anti-reflection condition is obtained) is focused on the coated surface of the disc. The intensity of the light beam is controlled in accordance with information to be recorded. Illustratively, the control is effected in accordance with carrier waves modulated in frequency by picture-representative video signals, with the light beam intensity varying as a result between a high level sufficient to effect ablation of the absorptive material and a low level insufficient to effect such ablation, the frequency of the level alternations varying as the video signal amplitude changes.

An information track comprising a succession of spaced pits is formed in the coated surface of the disc, the pits appearing in those surface regions exposed to the high level beam, due to vaporization of the absorptive layer material in response to the high level beam exposure. Variations in the length and separation of the pits are representative of the recorded information. Where a continuous sequence of pictures is to be recorded, a spiral information track may be formed by providing relative motion, in a radial direction and at a constant rate during the recording between the recording beam and the rotating disc. Alternatively, in the absence of such relative motion during the recording, a circular information track may be formed; appropriate for "slide" recording purposes.

The result of the above-described recording process is the formation of an information record of a form which facilitates recovery of the recorded information by optical playback processes. The information track of such an information record comprises (1) undisturbed surface regions that exhibit very low reflectance at an appropriate light frequency (due to the anti-reflection thickness choice described previously), alternating with (2) pit regions, formed by the ablation process, that exhibit appreciably higher reflectance at the same light frequency (due to complete, or at least partial, removal of the absorptive layer covering of the reflective surface of the substrate, ensuring departure from the anti-reflection condition). A high ratio between the reflectance of the pit regions and the reflectance of the intervening (undisturbed surface) regions is readily provided.

In playback operations pursuant to the principles of the present invention, a light beam is focused upon the information track of a rotating information record of the above-described type. The playback beam has a constant intensity at a level insufficient to effect ablation of the disc coatings, and is of a frequency substantially corresponding to that at which the undisturbed surface regions exhibit an anti-reflection condition. A photodetector, positioned to receive light reflected from the successive regions of the information track as they pass through the path of the focused light, develops a signal representative of the recorded information. A high readout contrast ratio (due to the large differences in a reflectance of the pit regions and the intervening track regions, at the light frequency of the playback beam) is readily obtained, permitting recovery of the recorded video signals with an excellent signal-to-noise ratio.

In the accompanying drawings:

FIG. 1 provides a cross-sectional view of a portion of a recording medium, exhibiting a construction in accordance with principles of the present invention;

FIG. 2 illustrates a cross-sectional view of a portion of the information track of an information record formed from a recording medium of the type shown in FIG. 1 pursuant to principles of the present invention;

FIG. 3 provides a representation, partially in block diagram form, of optical recording apparatus suitable for use in formation of an information record of the type shown in FIG. 2 pursuant to principles of the present invention, as well as playback apparatus suitable for use in recovery of recorded information from an information record of the type shown in FIG. 2 in accordance with principles of the present invention; and FIG. 4 provides a graph of the relationship between surface layer thickness and reflectance for an illustrative form of the recording medium of FIGS. 1 and 2.

In FIG. 1, a cross-sectional view of a portion of a record blank 10, formed for use in an optical recording system, shows the construction of a recording medium pursuant to an illustrative embodiment of the present invention. The record blank 10 includes a substrate 11, which is illustratively formed in the shape of a disc, a major surface(s) of which is processed to be polished and flat. Desirably, the substrate 11 is formed of a material, such as glass, for example, which may be conveniently processed to achieve such surface.

Overlying the surface "s" of the substrate 11 is a thin layer 13 of a material exhibiting a high reflectivily (over at least a given portion of the light spectrum). Illustratively, the reflecting layer 13 is formed of a metal, such as aluminum, for example, deposited on the surface "s" by an evaporation process.

Overlying the reflecting layer 13 is a layer 15 of material which is highly light absorptive (at least over the aforementioned given portion of the light spectrum). Illustratively, the absorptive layer 15 is formed of an organic dye, such as fluorescein, for example, deposited on the reflecting layer 13 by an evaporation process.

An advantage of the use, in the illustrated construction of the recording medium, of an absorptive layer overlying a reflective surface will be recognized by consideration of the effect achieved when a light beam L (of a frequency in the aforementioned given portion of the spectrum) is directed along an axis ($x$) normal to the surface "s," and focused at or near the surface of the absorptive layer 15. Most of that portion of the incident light which reaches the interior boundary of the absorptive layer 15 is not "lost" through transmission into the substrate 11, as would occur in the absence of the reflecting layer 13, but rather is reflected back into the absorptive layer 15. The consequence is exposure of the absorptive layer 15 to both incident and reflected light. Where it is desired to effect surface ablation in response to recording light exposure, this avoidance of transmission losses into the interior of the recording medium increases the coupling of energy from the recording light beam into the surface material, enhancing recording sensitivity. While a similar avoidance of transmission losses into the interior of the recording medium would be achieved by forming the surface layer of a reflecting material (not covered by an absorptive layer), the transmission loss avoidance would be offset by high reflection losses.

For optimum efficiency of coupling of energy from the recording light beam L into the absorptive layer 15, reflection losses are desirably reduced to a low level by choosing the thickness ($d_1$) of the absorptive layer 15, with relation to the thickness ($d_2$) of the reflecting layer 13 and the optical constants of the elements of the system 15-13-11, to establish a so-called anti-reflection condition for the system at the recording beam frequency. The achievement of an anti-reflection effect by use of thin films of appropriate thicknesses and optical properties is well-known, per se, and applications of the effect with films of transmissive materials are widespread in optical equipment. Formulae which may be used in arriving at parameter combinations for the absorptive media (15,13) of the FIG. 1 system that result in the desired anti-reflection condition are presented herein subsequently, in connection with a discussion of FIG. 4.

When the intensity of the focused light beam L is of sufficient magnitude, material of the absorptive layer 15 is elevated to an ablation temperature, and vaporization of the material occurs, forming a pit in the surface of the record blank 10. With suitable modulation of the intensity of the beam L in accordance with a recording signal, as successive regions of the record blank 10 pass through the beam path, an information track may be formed comprising spaced pits in regions of the absorptive layer subject to the high intensity beam exposure, separated by undisturbed regions of the absorptive layer (that were not subject to such high intensity beam exposure).

FIG. 2 illustrates a portion of an information record formed when the record blank 10 of FIG. 1 is subjected to such controlled beam exposure. As shown in cross-section in FIG. 2, the information track comprises a succession of spaced pits $p_1, p_2, p_3, p_4$, separated by regions ($u_1, u_2, u_3, u_4$) in which the surface of the absorptive layer 15 is undisturbed. For illustrative purposes, the depth of each pit is shown as being equal to the thickness of the absorptive layer 15, whereby the reflective layer 13 is wholly uncovered in the pit regions. As will be discussed subsequently, while such a depth of ablation may desirably result in maximization of the readout contrast ratio, it is not essential for good playback results. Thus, in an acceptable alternative to the illustrated form of information record, a residual portion of the absorptive material (with a thickness, of course, less than $d_1$) may overlie the reflecting layer 13 in the pit bottoms.

FIG. 3 illustrates combined recording/playback apparatus useful for the purposes of the present invention. For an initial explanation of operation of the illustrated apparatus in the recording mode, it should be assumed that the disc 10', supported on a turntable 20 which is subject to rotation at a constant rotational rate (e.g., 1800 rpm) by the turntable rotational drive mechanism 21, is a record blank of the form shown in FIG. 1.

The monochromatic light output of a laser 31 (illustratively, of an argon type providing an output wavelength of 4579 angstrom units) is passed via a polarizer 32 and an intensity modulator 33 to a polarized beam splitter. The polarizer 32 effects a polarization of the laser output in a direction that permits passage of the intensity modulated light through the beam splitter 35. The intensity modulator 33 is driven by a modulator driver 55, responsive to a carrier wave source in the form of a frequency modulated oscillator 53. The frequency of the carrier wave output of oscillator 53 is subject to variation in accordance with the amplitude of a modulating signal provided a source 51 of video signals to be recorded. The light intensity of the output of modulator 33 is shifted between high and low levels in consonance with the modulated carrier waves.

A lens 37 forms the light passed by beam splitter 35 into a beam which passes through a quarter-wave plate 39 to a mirror 41 which reflects the beam onto the entrance aperture of a lens 43. The lens 43 focuses the light beam reflected by mirror 41 on the absorptive surface layer (15) of the disc 10'. An absorptive layer region in the path of the focused light beam when the light beam intensity level is high suffers ablation, while an absorptive layer region in the path of the focused light beam when the light beam intensity level is low remains undisturbed. The result is formation of an information track of the general type shown in FIG. 2. When the frequency of the carrier waves controlling the intensity modulator 33 is high, the spacing between successive pits in the information track is short (see e.g., spacing between pits $p_1$ and $p_2$); when the carrier wave frequency is low, the pit spacing is long (see, e.g., spacing between pits $p_3$ and $p_4$).

A lens translational drive mechanism 61 provides a constant rate radial motion of an assembly 40 (incorporating lens 43 and mirror 41), when a spiral track formation is desired, or a stepped radial motion when it is desired to form a circular track, or a series thereof.

When the light frequency of the recording beam provided by laser 31 falls in the given spectrum portion for which the disc's layer 13 is highly reflective and for which the disc's layer 15 is highly absorptive, and at or close to the frequency at which the system 15-13-11 exhibits the anti-reflection effect, a high recording sensitivity is obtained.

For an explanation of operation of the apparatus of FIG. 3 in a playback mode, it may be assumed that the rotating disc 10' is of a recorded form as shown by the information record construction of FIG. 2. In the playback mode, variation of the intensity of the laser output is discontinued by a suitable disabling of the modulation control system 51-53-55. The mode of operation of the translational drive mechanism 61 is chosen to be appropriate for scanning of the form of information track desired to be played back. The constant intensity of the laser output is set at a playback level safely below the level causing ablation of the material of the absorptive layer 15. The laser beam follows the previously described path (via elements 32, 33, 35, 37, 39, 41) to lens 43 which focuses the beam on the desired information track of disc 10'. Light reflected from the information track is returned via elements 43, 41, 39 and 37 to the beam splitter 35. As the returned light has made two passes through the quarter-wave plate 39, its polarization has been altered to a direction which results in reflection of the returned light by beam splitter 35 to a photodetector 71.

The intensity of light falling upon the photodetector 71 alternates between a minimum level and a maximum level as the successive regions ($p_1$, $u_1$, $p_2$, $u_2$, etc.) of the information track pass through the path of the focused beam. The minimum intensity level for light reaching the photodetector 71 is obtained when an undisturbed region ($u_1$, $u_2$, etc.) of the absorptive layer 15 is in the focused beam path, while the maximum intensity level for light reaching the photodetector 71 is obtained when a pit ($p_1$, $p_2$, etc.) is in the focused beam path.

The output of photodetector 71 comprises carrier waves with zero crossings recurring at frequencies varying in consonance with the pit edge spacing variations passing through the focused beam path. The photodetector output is applied to a bandpass filter 73, which selectively passes signal components falling within the deviation range employed for oscillator 53 and appropriate sidebands thereof. The output of bandpass filter 73 is applied via a limiter 75 (removing spurious amplitude modulation of the frequency modulated carrier waves) to the input of an FM demodulator 77, which recovers the recorded video signal information.

When the light frequency of the playback beam provided by laser 31 falls in the given spectrum portion for which the disc's layer 15 is highly absorptive and for which the disc's layer 13 is highly reflective, and at or close to the frequency at which the undisturbed regions of the system 15-13-11 exhibits the anti-reflection effect, a high readout contrast ratio is realized, permitting the video signal recovery with an excellent signal-to-noise ration. Illustratively, with use of a deviation range of 7–10 MHz., color television signals of an NTSC format have been recovered with a video signal-to-noise ratio of 55–60 db (peak-to-peak video to rms noise) for a video bandwidth of 5 MHz.

The reflectance of a system of two absorbing layers, such as the system of FIG. 1 (incorporating a dye layer on top of a metallic layer on a glass substrate), can be calculated using formulae well known in the theory of thin film optics. The reflectance of such a system is given by the square of the modulus of the amplitude reflection coefficient of the system. The amplitude reflection coefficient of such a system is given by the following expression:

$$r = \frac{r_1 + r_2 e^{-2i\delta_1} + r_3 e^{-2i(\delta_1 + \delta_2)} + r_1 r_2 r_3 e^{-2i\delta_2}}{1 + r_1 r_2 e^{-2i\delta_1} + r_1 r_3 e^{-2i(\delta_1 + \delta_2)} + r_2 r_3 e^{-2i\delta_2}}$$

where $r_1$, $r_2$, $r_3$ are the Fresnel reflection coefficients at the air to dye, dye to metal, and metal to substrate interfaces respectively, and are complex numbers, and where $i = \sqrt{-1}$.

The Fresnel reflection coefficients are given in terms of the complex indices of refraction, as follows:

$$r_1 = \frac{\tilde{\eta}_0 - \tilde{\eta}_1}{\tilde{\eta}_0 + \tilde{\eta}_1} \quad r_2 = \frac{\tilde{\eta}_1 - \tilde{\eta}_2}{\tilde{\eta}_2 + \tilde{\eta}_3} \quad r_3 = \frac{\tilde{\eta}_2 - \tilde{\eta}_3}{\tilde{\eta}_2 + \tilde{\eta}_3}$$

where $\tilde{\eta}_0$, $\tilde{\eta}_1$, $\tilde{\eta}_2$, $\tilde{\eta}_3$ are the complex indices of refraction respectively of the media: air, dye, metal, and glass substrate. The complex index of refraction is a complex number, $\tilde{\eta} = \eta - ik$, which incorporates the real part $\eta$ and the imaginary part $k$ and characterizes the intrinsic optical properties of a medium. For non-absorbing media the imaginary part of the index is zero.

The quantities $\delta_1$ and $\delta_2$ are given by $$\delta_1 = \frac{2\pi}{\lambda} \tilde{\eta}_1 d_1$$

$$\delta_2 = \frac{2\pi}{\lambda} \tilde{\eta}_2 d_2$$

where $d_1$ and $d_2$ are the thicknesses of the dye and metal layers respectively and $\lambda$ is the wavelength of the light in air. Note that $\delta_1$ and $\delta_2$ are complex quantities because of the dependence on the complex indices.

The reflectance of the system of FIG. 1 can thus be readily evaluated with a computer as a function of the film thicknesses and optical constants. One such calculation for fluorescein on aluminum on glass is plotted in FIG. 4. In this case the assumed parameters were: aluminum thickness = 100 Å; wavelength of light = 4579 Å; index of dye = (1.842 − i.362); and index of aluminum = (0.47 − i4.84).

The graph of FIG. 4 shows that the minimum reflectance for the illustrative system parameter choices for the system of FIG. 1 occurs at a dye layer thickness of approximately 500 angstrom units. Thus, when this thickness value is associated with the illustrative system parameter choices, the record blank of FIG. 1 (and the non-depressed regions of the information record of FIG. 2) exhibits an anti-reflection condition for the argon laser output.

While the principles of the present invention have been demonstrated with particular regard to the illustrative structures of FIGS. 1 and 2, it will be recognized that various departures from such illustrative structures may be undertaken in practice of the invention. For example, the substrate itself may be formed of material having high reflectivity, eliminating the need for employing a separate reflecting layer in forming a reflective surface underlying the absorptive layer. For another example, since wideband reflection is not required of the reflecting layer, the metal coating may be supplanted by a multilayer (or even a single layer) dielectric reflector. It should also be appreciated that other forms of optical recording (such as pulsed holographic recording) may use the advantageous record blank structure described herein.

What is claim is:

1. An information record, for use in playback apparatus employing a playback beam of light of a given frequency; said record comprising:
    a substrate having a light reflective surface; and
    a layer of light absorptive material overlying said reflective surface, with an information track formed in said layer;
    wherein said information track comprises a succession of spaced pits, with variations in the spacing between successive pit edges representative of recorded information;
    wherein the thickness of said layer in all regions of said record other than those occupied by said pits is a given thickness chosen to establish an anti-reflection condition for all said other record regions for light at said given frequency directed toward said light reflective surface through said absorptive layer; and
    wherein the thickness of said layer in those record regions occupied by said pits is significantly less than said given thickness.

2. An information record in accordance with claim 1 wherein said substrate is in the form of a disc and wherein said light reflective surface comprises a metal layer deposited on a major surface of said disc.

3. An information record in accordance with claim 2 wherein said light absorptive layer is formed by an organic dye material.

4. An information record, for use with playback apparatus responding to record reflection of a beam of light of a given frequency; said record comprising:
    a substrate disc;
    a coating of material exhibiting high reflectance for light of said given frequency overlying a major surface of said substrate disc;
    a layer of material highly absorptive for light of said given frequency overlying said coating, with an information track formed in said layer;
    wherein said information track comprises a succession of spaced pits, with variations in the spacing between successive pit edges representatives of recorded information;
    wherein the thickness of said reflective coating, and the optical constants of the material of said substrate, of said reflective coating material, and of said absorptive layer material are such that said substrate disc and the materials overlying said major surface of said substrate disc form a multilayer optical element which exhibits, for light of said given frequency directed toward said substrate surface through said overlying materials, variations in reflectance versus absorptive layer thickness following a characteristic having a plurality of separate reflectance minimums at spaced absorptive layer thickness values; and
    wherein the thickness of said absorptive layer, in all regions of said record other than those occupied by said pits, is substantially equal to the lowest of said spaced absorptive layer thickness values; and
    wherein the thickness of said absorptive layer in record regions occupied by said pits is significantly less than said lowest of said spaced absorptive layer thickness values.

5. An information record in accordance with claim 4 wherein said reflectance versus absorptive layer thickness characteristic is such that the reflectance for said multilayer optical element is substantially zero for said directed light of said given frequency at said lowest of said spaced absorptive layer thickness values.

* * * * *

UNITED STATES PATENT OFFICE
CERTIFICATE OF CORRECTION

PATENT NO. : 4,097,895
DATED : June 27, 1978
INVENTOR(S) : Fred William Spong

It is certified that error appears in the above-identified patent and that said Letters Patent are hereby corrected as shown below:

Column 1, line 59, that portion reading "as" should read -- at --; Column 3, line 22, that portion reading "surface(s)" should read -- surface (s) --; line 27, that portion reading "reflectivily" should read -- reflectivity --.

Signed and Sealed this

Twelfth Day of December 1978

[SEAL]

Attest:

RUTH C. MASON
Attesting Officer

DONALD W. BANNER
Commissioner of Patents and Trademarks